UNITED STATES PATENT OFFICE.

ARTHUR HAUSDÖRFER, OF ELBERFELD, AND CARL HEIDENREICH, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

TRIPHENYLMETHANE DYE.

999,028. Specification of Letters Patent. Patented July 25, 1911.
No Drawing. Application filed January 16, 1911. Serial No. 602,986.

*To all whom it may concern:*

Be it known that we, ARTHUR HAUSDÖRFER and CARL HEIDENREICH, doctors of philosophy, chemists, citizens of the German Empire, residing, respectively, at Elberfeld and Leverkusen, near Cologne, Germany, have invented new and useful Improvements in New Triphenylmethane Dye, of which the following is a specification.

It has been found that new and valuable triphenylmethane dyestuffs capable of being chromed after dyeing are obtained by treating the leuco compounds of the triphenylmethane series, (obtained by condensing aminobenzaldehydes which may contain substituents in the benzene nucleus with 2 molecules of an aromatic oxycarboxylic acid) with chlorodinitrobenzene compounds, especially 1.3-dichloro-4.6-dinitrobenzene, 1-chloro-2.4-dinitrobenzene, 1-chloro-2.6-dinitrobenzene-4-sulfonic acid, 1-chloro-4.6-dinitrobenzene-2-sulfonic acid and by converting the resulting leuco compounds into the dyestuffs by oxidation.

The new dyestuffs are after being dried and pulverized from red to red-brown powders which are soluble in concentrated sulfuric acid with a red coloration and are characterized by containing in their molecule the group:

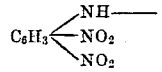

They dye wool from acid bath yellow to yellow-red shades, which turn green to black on chroming. The chromed shades are fast to potting and to light.

In order to illustrate the new process more fully the following examples are given, the parts being by weight:

Example 1: 90 parts of the leuco compound obtained from ortho-chloro-meta-aminobenzaldehyde and 2 molecules of ortho-cresotinic acid are dissolved in 400 parts of water and 33 parts of calcinated sodium carbonate and are boiled with 44 parts of chlorodinitrobenzene for 8 to 10 hours in a vessel provided with a reflux condenser. The sodium salt of the condensation product thus obtained crystallizes from the cooling solution. It is filtered off and dried. Recrystallized from hot water the sodium salt is obtained in the shape of golden yellow leaflets. To convert it into the dyestuff 66 parts of the dried sodium salt are dissolved in 350 parts of concentrated sulfuric acid and into the resulting mixture a solution of 7 parts of sodium nitrite in 100 parts of concentrated sulfuric acid is added. The mixture is heated while it is stirred to 50° C. until the quantity of the dyestuff thus produced does no longer increase. The sulfuric acid solution is introduced into ice, the precipitate is filtered off, washed with water and dried. The dyestuff which is produced according to the following equation:

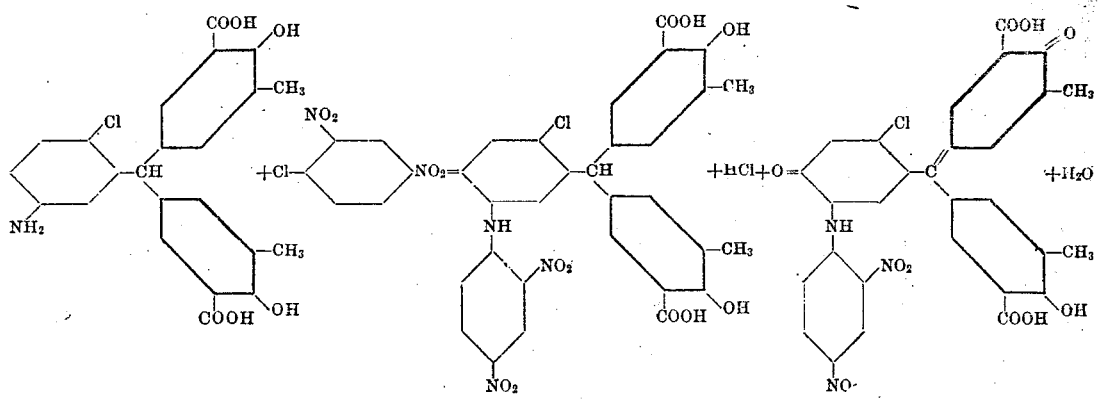

is a red powder, which is almost insoluble in water and is soluble in dilute soda solution yielding a yellowish color, in weak caustic soda lye with a bluish color and in concentrated sulfuric acid with a red color. It dyes wool from acid bath an intense yellow, which turns blue-greenish on chroming.

Example 2: 90 parts of the leuco compound obtained from ortho-chloro-para-aminobenzaldehyde and 2 molecules of ortho-cresotinic acid are dissolved in water and sodium carbonate according to Example 1 and boiled with 44 parts of chloro-dinitrobenzene in a vessel provided with a reflux condenser. Sulfuric acid is added to the cooled solution and the separated leuco compound is then filtered off, washed with water, dried and ground. It has a deep yellow color and is soluble with the same color in dilute alkalis. The oxidation of the condensation product is performed as in Example 1. The dyestuff is obtained as a dark brown powder, which is difficultly soluble in water and soluble in a weak soda lye giving a brown-yellow color. The brown-yellow dyeing obtained in acid bath when treated with chrome passes to a full green.

When other leuco compounds instead of those described in Examples 1 and 2 are used as for instance those from meta-aminobenzaldehyde-ortho-sulfonic acid and 2 molecules ortho-cresotinic acid a dyestuff is obtained which is easily soluble in hot water. It dyes wool in acid baths orange which turns green on chroming. The ortho-cresotinic acid used in the above mentioned examples can be replaced totally or partially by other aromatic oxy-carboxylic acids, such as salicylic acid and their derivatives, alpha-oxy-naphthoic acid, etc.

We claim:—

1. The herein described new mordant dyestuffs of the triphenylmethane series, characterized by containing in their molecule the group:

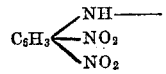

which dyestuffs are after being dried and pulverized from red to red-brown powders, being soluble in concentrated sulfuric acid with a red coloration; dyeing wool from acid baths generally yellow to yellow-red shades which on being treated with bichromate change into green to black fast to potting and light, substantially as described.

2. The herein described dyestuff having probably the following formula:

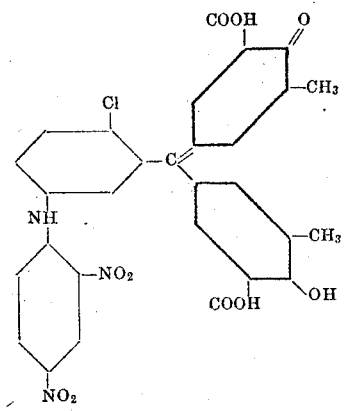

which is after being dried and pulverized a red powder scarcely soluble in water and soluble in a dilute solution of sodium carbonate with a yellowish color; dyeing wool from acid bath a yellow shade which on being treated with bichromate changes into a blue-green, substantially as described.

In testimony whereof we have hereunto set our hands in the presence of two subscribing witnesses.

ARTHUR HAUSDÖRFER. [L. S.]
CARL HEIDENREICH. [L. S.]

Witnesses:
 CHAS. J. WRIGHT,
 WALTER VONNEGUT.